(12) United States Patent
Floryan (10) Patent No.: US 9,625,698 B2
(45) Date of Patent: Apr. 18, 2017

(54) DEVICES AND METHODS OF CAPTURING BACK SCATTERED PARTICLES

(71) Applicant: Exelis Inc., McLean, VA (US)

(72) Inventor: Richard F. Floryan, Roanoke, VA (US)

(73) Assignee: Exelis Inc., McLean, VA (US)

( * ) Notice: Subject to any disclaimer, the term of this patent is extended or adjusted under 35 U.S.C. 154(b) by 331 days.

(21) Appl. No.: 13/665,015

(22) Filed: Oct. 31, 2012

(65) Prior Publication Data
US 2014/0117249 A1    May 1, 2014

(51) Int. Cl.
*H01J 3/14* (2006.01)
*G21K 1/02* (2006.01)
*G02B 23/12* (2006.01)
*H01J 31/50* (2006.01)

(52) U.S. Cl.
CPC ............ *G02B 23/12* (2013.01); *H01J 31/507* (2013.01)

(58) Field of Classification Search
CPC .... H01L 29/4236; H01J 29/023; H01J 31/507

USPC .......................................................... 313/543
See application file for complete search history.

(56) References Cited

U.S. PATENT DOCUMENTS

| 4,120,002 | A | * | 10/1978 | Lieber | 378/98.2 |
| 4,791,300 | A | * | 12/1988 | Yin | 250/363.01 |
| 5,495,141 | A | * | 2/1996 | Thomas | 313/528 |
| 6,522,061 | B1 | * | 2/2003 | Lockwood | 313/495 |
| 2003/0235272 | A1 | * | 12/2003 | Appleby et al. | 378/147 |
| 2005/0078798 | A1 | * | 4/2005 | Jiang | 378/147 |
| 2009/0193704 | A1 | * | 8/2009 | Pochapsky et al. | 42/120 |
| 2010/0039014 | A1 | * | 2/2010 | Kim et al. | 313/103 R |

* cited by examiner

*Primary Examiner* — Nimeshkumar Patel
*Assistant Examiner* — Jacob R Stern
(74) *Attorney, Agent, or Firm* — Edell, Shapiro & Finnan LLC (57) ABSTRACT

Provided is an apparatus comprising a source which emits at least one of particles or radiation. The particles or radiation are emitted towards a target. Arranged between the source and the target is a microchannel plate. Also arranged between the source and the target is a collimator.

21 Claims, 6 Drawing Sheets

DEVICES AND METHODS OF CAPTURING BACK SCATTERED PARTICLES

TECHNICAL FIELD

The present disclosure relates devices using microchannel plates, and in particular, image intensifiers using microchannel plates.

BACKGROUND

An image intensifier is a core component of all visible spectrum night vision devices, such as ground force and pilot goggles, weapon sights, and camera systems. The image intensifier takes the low level of visible light and near-infrared light that is available at night and amplifies it to a level that the eye can see.

Light is amplified in an image intensifier according to a three-step process. First, a low light image is focused onto a photocathode, which converts the image to an electron image. These electrons are emitted into a vacuum gap. Second, the emitted electrons are accelerated through an electric field and strike an input surface of an electron multiplier, such as a microchannel plate. The microchannel plate amplifies the signal, emitting a stream of several hundred electrons for each incoming electron. The emitting electrons are sent into another vacuum space. Third, the emitted electrons are accelerated through another electric field and strike a luminescent screen that reconverts the amplified electron image into a visible image.

The reconverted visible image may be thousands of times brighter than the original visible image, allowing the user to view the reconverted image.

DESCRIPTION OF EXAMPLE EMBODIMENTS

Overview

Provided is an apparatus comprising a source which emits at least one of particles or radiation. The particles or radiation are emitted towards a target. Arranged between the source and the target is a microchannel plate. Also arranged between the source and the target is a collimator.

Example Embodiments

Figure 1:
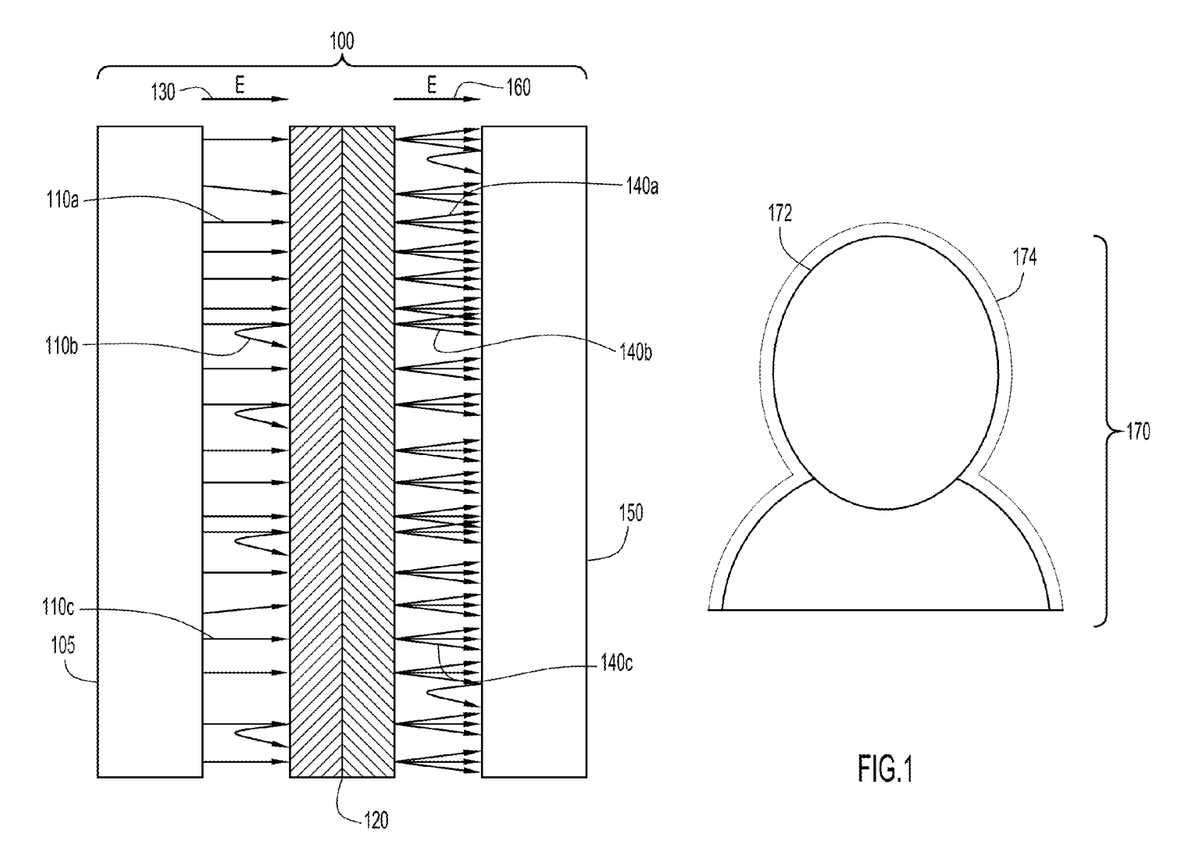
FIG. 1 is an illustration of an example image intensifier.

Depicted in FIG. 1 is image intensifier 100. A source, in this case photocathode 105, sends particles or radiation, in this case electrons 110a-c, towards microchannel plate 120. Electric field 130 is located between source 105 and microchannel plate 120 and accelerates electrons 110a-c towards microchannel plate 120. Electrons which enter channels in microchannel plate 120 are multiplied, causing multiplied electrons 140a-c to project towards a target, in this case phosphor screen 150. Electric field 160 may accelerate multiplied electrons 140a-c towards phosphor screen 160. The multiplied electrons 110a-c strike phosphor screen 150, causing phosphor screen 150 to project image 170.

Image 170 is comprised of main image 172 and halo 174. Halo 174 appears as a bright, fuzzy zone which surrounds bright spots in image 170. The effect is similar to viewing a bright light through a fog. Halo 174 is caused when electrons are deflected from their initial path, and strike phosphor screen 150 outside the region to which they were originally directed by photocathode 105. For example, electron 110b is incident on a region of microchannel plate 120 that is not occupied by a channel. Accordingly, electron 110b is back scattered towards photocathode 105. Yet, due to the presence of electric field 130, electron 110b is reaccelerated back towards microchannel plate 120. Electron 110b reverses direction and is incident on microchannel plate 120 at a location slightly different from where it was originally incident on microchannel plate 120, in this case, a slightly higher position on microchannel plate 120. If electron 110b enters a channel in microchannel plate 120, it will be multiplied, resulting in multiplied electrons 140b. Multiplied electrons 140b strike phosphor screen 150 at a location slightly above where they would have struck had electron 110b passed through microchannel plate 120 without first being back scattered. As a result, multiplied electrons 140b contribute to halo 174.

Additionally, electron 140c will strike phosphor screen 150 and rebound back towards microchannel plate 120. Due to the presence of electric field 160, electron 140c will be accelerated back towards phosphor screen, causing electron 140c to reverse direction and head back towards phosphor screen 150. Electron 140c will strike phosphor screen 150 at a location slightly offset from where it originally struck the screen, thereby contributing to halo 174.

Figure 2:
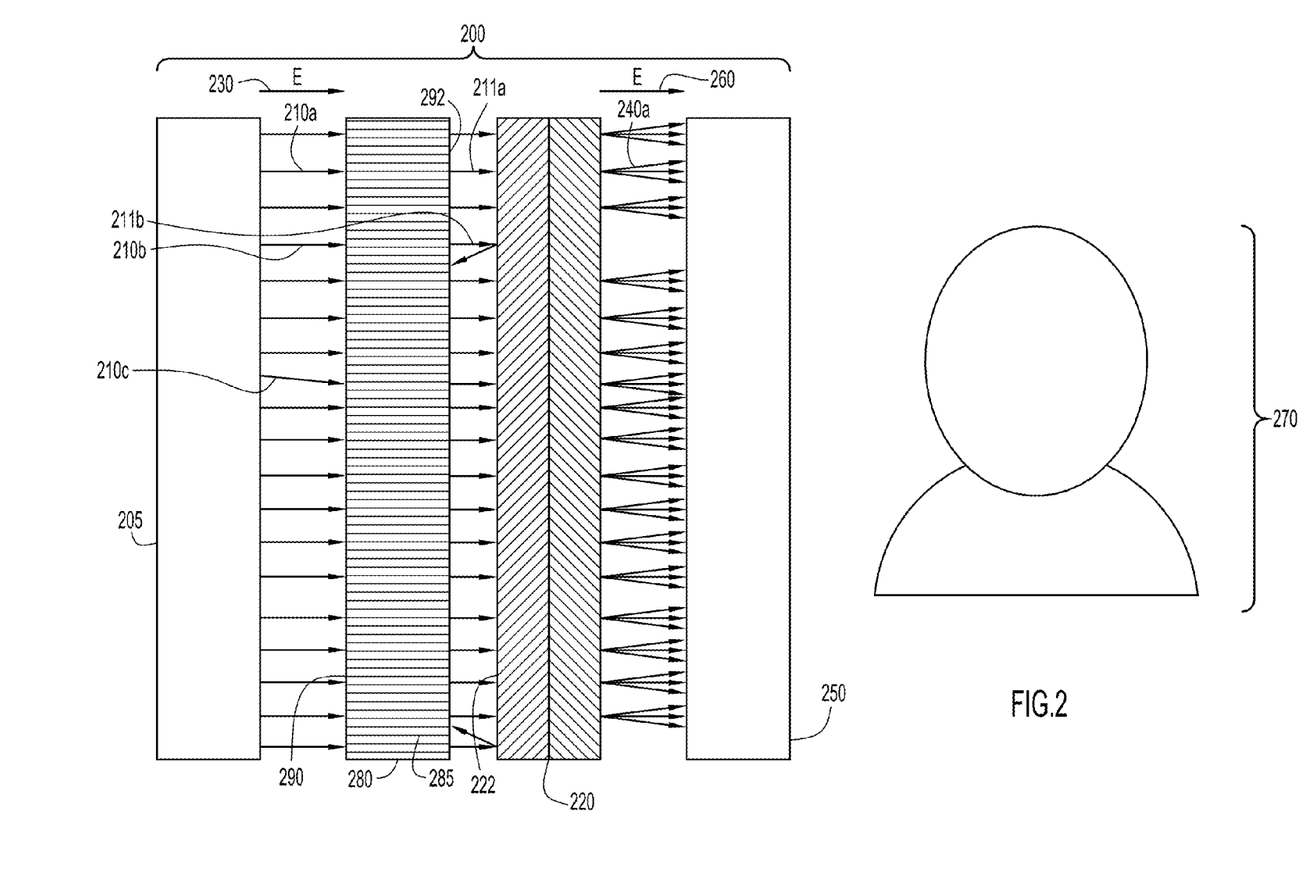
FIG. 2 is an illustration of an example image intensifier comprising a collimator.

Turning now to FIG. 2, depicted therein is an example image intensifier 200, comprising a source, in this case photocathode 205, microchannel plate 220 and a target, in this case phosphor screen 250. Arranged between photocathode 205 and microchannel plate 220 is collimator 280. Accordingly, photocathode 205 sends electrons 210a-c towards phosphor screen 250. The sent electrons 210a-c may comprise an electron image corresponding to a light image focused on the photocathode 205. Additionally, the area between photocathode 205 and phosphor screen 250 may be under vacuum. Specifically, the area between photocathode 205 and microchannel plate 220 may comprise a first vacuum space, while the area between the microchannel plate and the phosphor screen may comprise a second vacuum space.

The majority of the sent electrons, such as electrons 210a and 210b, will pass through collimator 280, and will be accelerated toward microchannel plate 220 as collimated electrons 221a-b. According to this example, collimator 280 comprises a plate with holes or channels 285 surrounded by very thin walls. The collimators may be comprised of amorphous materials, such as drawn glass, or crystalline structures. Specific examples of collimators are constructed of semi-conductor materials such as silicon. In other words, source facing side 290 of collimator 280 is filled with a large number of channels 285 which pass through collimator 280, and exit at multichannel plate facing side 292. Channels 285 may be oriented substantially parallel to electric field 230.

Accordingly, if electrons 210a-c are sent towards collimator 280 at a sufficiently small angle, the electrons will pass through collimator 280 and continue on to microchannel plate 220. As with the embodiment described with reference to FIG. 1, some of the collimated electrons, such as collimated electron 211$b$, will be incident on microchannel plate 220 at a portion of microchannel plate 220 where a channel is not present, and will backscatter towards collimator 280. However, collimator 280 is positioned such that there is insufficient room for electron 211$b$ to be reaccelerated back towards microchannel plate 220. If electron 211$b$ strikes a portion of collimator 280 that is not occupied by a channel 285, electron 211$b$ will be captured by collimator 280, in this case, absorbed by the wall of collimator 280. On the other hand, if electron 211$b$ enters a channel 285, electron 211$b$ will be absorbed by the walls of channel 285 due to travelling at an angle relative to channel 285.

By arranging collimator 280 between cathode 205 and microchannel plate 220, electron 211$b$ is prevented from being multiplied by microchannel plate 220, and therefore, electron 211$b$ does not cause any multiplied electrons to be incident on phosphor screen 250. Because electron 211$b$ would have contributed to a halo around image 270, by blocking electrons, such as electron 211$b$, no halo will be formed around bright areas of image 270, or the halo may be significantly reduced.

Additionally, collimator 280 may comprise a first side face active area 292 which faces, but does not touch multichannel plate 220, and a second side face active area 290 which faces, but does not touch photocathode 205. In other words, the active area of the collimator 280 is free floating in the area between the source and the multichannel plate. For example, if the microchannel plate 220 comprises a barrier film on a collimator facing side 222, collimator 280 should not be placed in contact with face 222 to prevent damage to the barrier film. Of course, non-active areas of the source 205, first side face 290 and second side face 292 of the collimator 280, and the microchannel plate 220 may be in contact to, for example, assemble the device.

A few electrons, such as electron 210$c$ will be stopped by collimator 280. This is because electron 210$c$ is sent from the cathode 205 at a sufficiently large angle, that it will be blocked by the walls of a channel 285. This may result in a very slightly dimmer overall image, but this is more than compensated for by the additional clarity provided by the lack of halos around the bright spots of the image.

Figure 3:
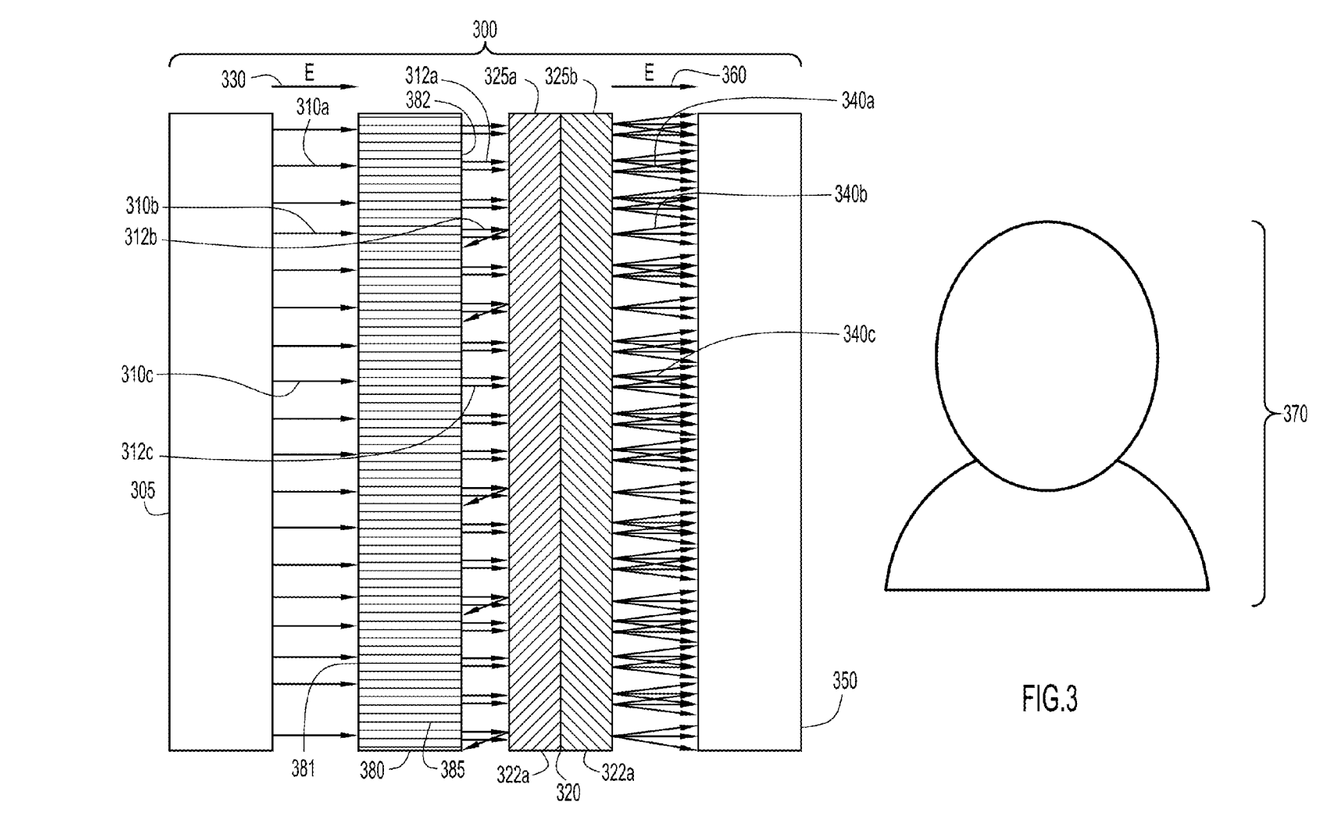
FIG. 3 is an illustration of another example image intensifier comprising a collimator.

With reference now made to FIG. 3, illustrated is example image intensifier 300. The construction of image intensifier 300 is similar to that of the image intensifier 200 of FIG. 2, however, collimator 380 of image intensifier 300 is comprised of a crystalline material that is doped with an alkali metal. Accordingly, when electrons 310$a$-$c$ pass through collimator 380, the electrons will be multiplied by the collimator 380, thereby forming multiplied electrons 312$a$-$c$. In other words, collimator 380 acts as an additional multichannel plate for multiplying the electrons 310$a$-$c$ or radiation emitted by source 305. Collimator 380 may be comprised of a crystalline material doped with an alkali metal. Specifically, collimator 380 may be comprised of a semiconductor material, such as silicon, and doped with an alkali metal, though any material system that can be used to obtain electron multiplication in a microchannel plate can also be used in the collimator. For example, a secondary emitting material such as aluminum oxide could be used in the channels.

Furthermore, a metal coating is formed on a photocathode-facing side 381 and on a microchannel plate-facing side 382 of collimator 380. These metal coatings serve as electrodes which will allow the collimator 380 to multiply electrons which are incident on the walls of channels 385. Furthermore, the metal coating may be partially absorbed into the walls of channels 385 during the process by which the electrodes are applied to collimator 380.

Multiplied electrons 312$a$-$c$ will be incident on microchannel plate 320, with some of the electrons, such as electrons 312$b$, striking and rebounding from a portion of microchannel plate 320 at which there is no channel. To prevent electron 312$b$ from being accelerated back towards microchannel plate 320, collimator 380 is positioned such that there is insufficient room for electron 312$b$ to be reaccelerated back towards microchannel plate 320. If electron 310$b$ strikes a portion of collimator 380 that is not occupied by a channel 385, electron 310$b$ will be absorbed by collimator 380. Alternatively, if electron 312$b$ enters a channel 385, it may strike an inside wall of channel 385 and be multiplied. Nevertheless, the multiplied electrons will be directed back towards photocathode 305, and will be unlikely to add to a halo in image 370.

If collimator 380 is embodied in a microchannel plate with channels 385 substantially parallel to electric field 330, the multiplication of electrons 310$a$-$c$ may be less than the multiplication provided by microchannel plate 320. Specifically, microchannel plate 350 may be comprised of a chevron microchannel plate which is formed from first microchannel plate 322$a$ with channels 325$a$ arranged at a first angle, and second microchannel plate 322$b$ with channels 325$b$ arranged at a second angle perpendicular to the angle of channels 325$a$. Similarly, the microchannel plate may comprise a Z stack microchannel plate in which three microchannel plates are arranged in a "Z" shape. With the channels of microchannel plate 320 arranged at angles to each other, each electron that enters microchannel plate 320 is very likely to strike an interior wall of the channel, and thereby be multiplied. Because collimator 380 has channels 385 arranged parallel to the direction of electric field 330, the likelihood that an electron that enters collimator 380 will strike an interior wall of channel 385 is less than that of channels 325$a$-$b$. Accordingly, the multiplication of electrons 310$a$-$c$ is performed by collimator 380 may be less than the multiplication of electrons 312$a$-$c$ performed by microchannel plate 320. Nevertheless, the combination of collimator 380 and microchannel plate 320 may result in an overall brighter image.

According to additional examples, the channels 385 of collimator 380 may be arranged at a small angle relative to electric fields 330 and 360 in order to assure multiplication of electrons 310$a$-$c$. According to such an example, back scattered electrons 312$b$ will be prevented from contributing to a halo through absorption of electrons 312$b$ in the electrodes coating the microchannel plate-facing surface 381. Additionally, as noted above, when the electrodes are formed on photocathode-facing side 381 and on a microchannel plate-facing side 382 some of the metal is absorbed into the walls of channels 385. Accordingly, electrons 310$a$-$c$ which enter the channels 385 at extreme angles may be absorbed by the metal of the electrodes instead of being multiplied, contributing to the collimating effect of collimator 380.

Figure 4:
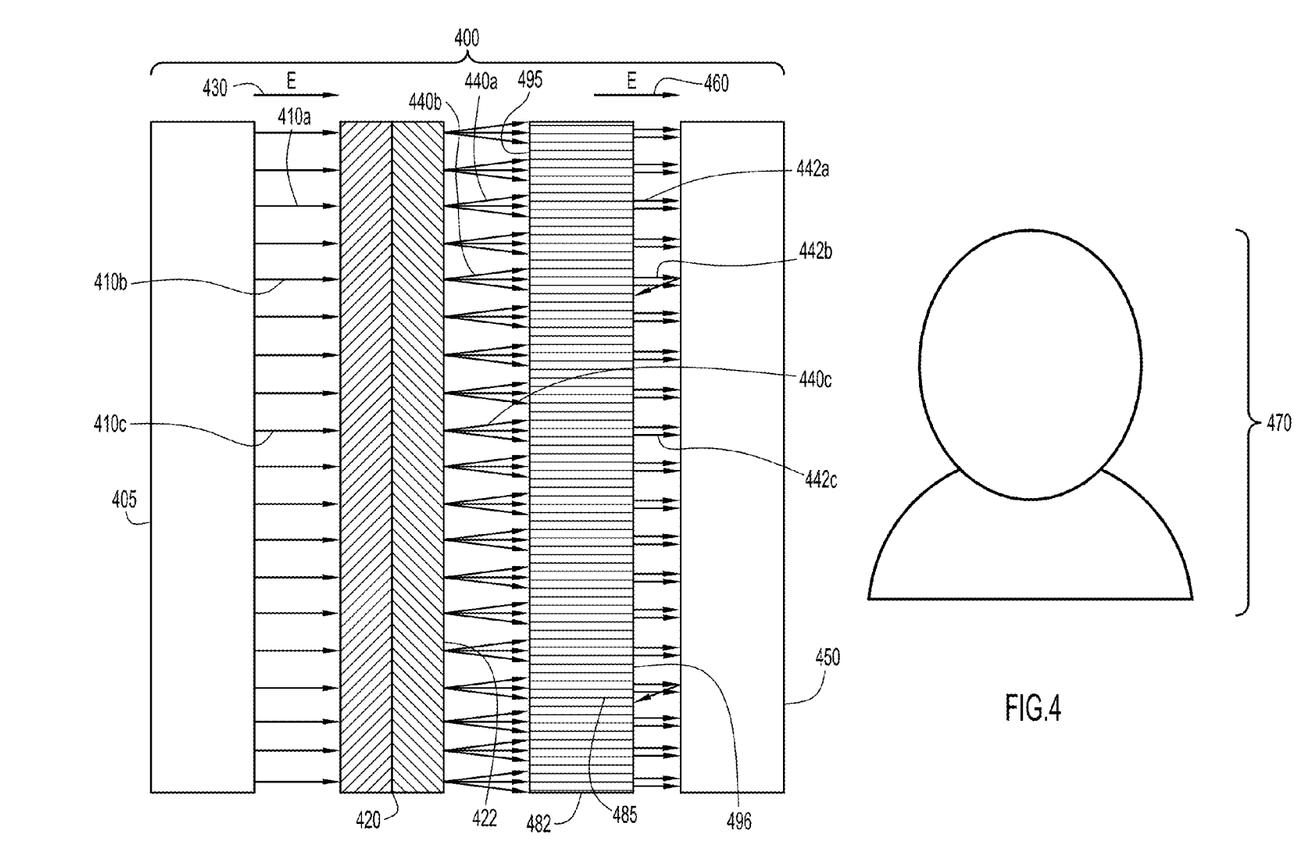
FIG. 4 is an illustration of a third example image intensifier comprising a collimator.

With reference now made to FIG. 4, depicted therein is an example light intensifier 400 in which collimator 482 is located between microchannel plate 420 and phosphor screen 450. Accordingly, sent electrons 410$a$-$c$ are accelerated from cathode 405 towards microchannel plate 420 by electric field 430. Microchannel plate 420 multiplies the electrons resulting in multiplied electrons 440$a$-$c$ being accelerated towards collimator 482 by electric field 460.

Multiplied electrons enter collimator 482, resulting in collimated electrons 442a-c being accelerated towards phosphors screen 450.

Many of collimated electrons 440a-c are incident on phosphor screen 450, resulting in image 470. Some of the collimated electrons, such as collimated electron 442b, may strike phosphor screen 450 and back scatter towards collimator 482. Without collimator 482 being present in the device, electron 442b would be accelerated by electric field 460 back towards to phosphor screen 450, possibly contributing to a halo in image 470. With collimator 482 being located between microchannel plate 420 and phosphor screen 450, electron 442b rebounds from phosphor screen 450 and is either absorbed at an outer wall of collimator 482, or in one of the walls of channels 485. Accordingly, electron 442b is prevented from being reaccelerated towards phosphor screen 450, and therefore, is prevented from contributing to a halo in image 470.

Additionally, collimator 482 may comprise a first side face active area 495 which faces, but does not touch multichannel plate 420, and a second side face active area 496 which faces, but does not touch phosphor screen 450. For example, if the microchannel plate 420 comprises a barrier film on a collimator facing side 422, the collimator should not be placed in contact with face 422 to prevent damage to the barrier film. Of course, non-active areas of microchannel plate 420, first side face 495 and second side face 496 of the collimator 480, and the phosphor screen 450 may be in contact to, for example, assemble the device.

Figure 5:
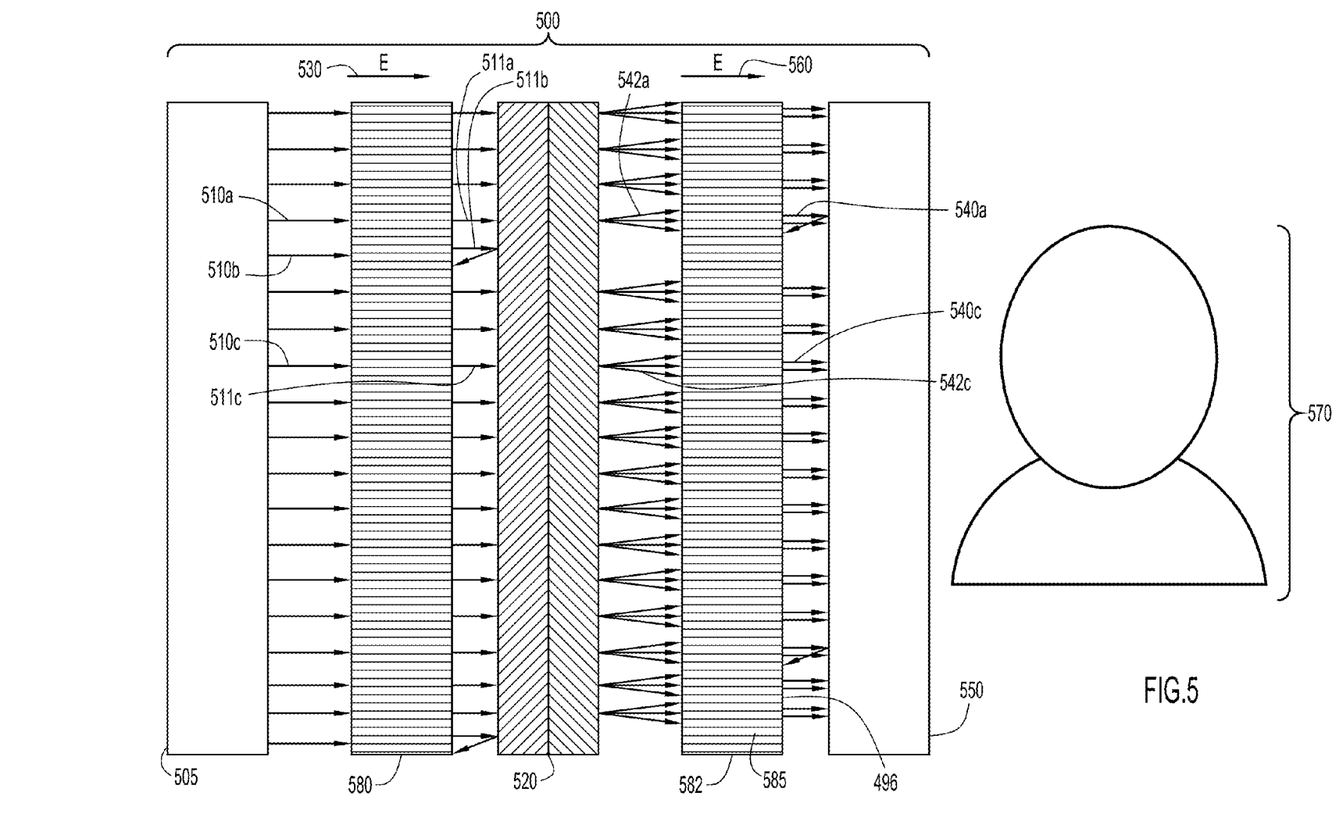
FIG. 5 is an illustration of an example image intensifier comprising two collimators.

Turning to FIG. 5, depicted therein is a light intensifier 500 which comprises two collimators, collimator 580 and collimator 582. Collimator 580 is arranged between photocathode 405 and microchannel plate 520. Accordingly, sent electrons 510a-c enter collimator 580 and exit as collimated electrons 511a-c. Collimated electrons 511a-c are accelerated by electric field 530 towards microchannel plate 520. Some of the collimated electrons, such as collimated electron 511b, back scatter from microchannel plate 520. Accordingly, electron 511b rebounds off of microchannel plate 520. However, collimator 580 is positioned so that there is insufficient room for electron 511b to be reaccelerated back towards microchannel plate 520. Therefore, collimator 580 prevents electron 511b from being multiplied by microchannel plate 520, thereby preventing electron 511b from contributing to a halo in image 570.

Collimated electrons 511a and c are accelerated towards microchannel plate 520 by electric field 530. Microchannel plate 520 multiplies the electrons resulting in multiplied electrons 540a and c being accelerated towards collimator 582 by electric field 560. Multiplied electrons 540a and c enter collimator 582, resulting in collimated electrons 542a and c being accelerated towards phosphors screen 550. Some of the collimated electrons, such as collimated electron 542a, back scatter from phosphor screen 550 towards collimator 582. Absent collimator 582, electron 542a would be accelerated by electric field 560 back towards to phosphor screen 550, contributing to a halo in image 570. By arranging collimator 582 between microchannel plate 520 and phosphor screen 550, electron 542a rebounds from phosphor screen 550 and is either absorbed at an outer wall of collimator 582, or at an inner wall of channel 585. On the other hand, electron 542c will strike phosphor screen 550 and contribute to image 570.

The devices described herein may be implemented in ground force and pilot goggles, weapon sights, camera systems, and other products which utilized microchannel plates to multiply charged particles and radiation.

Figure 6:
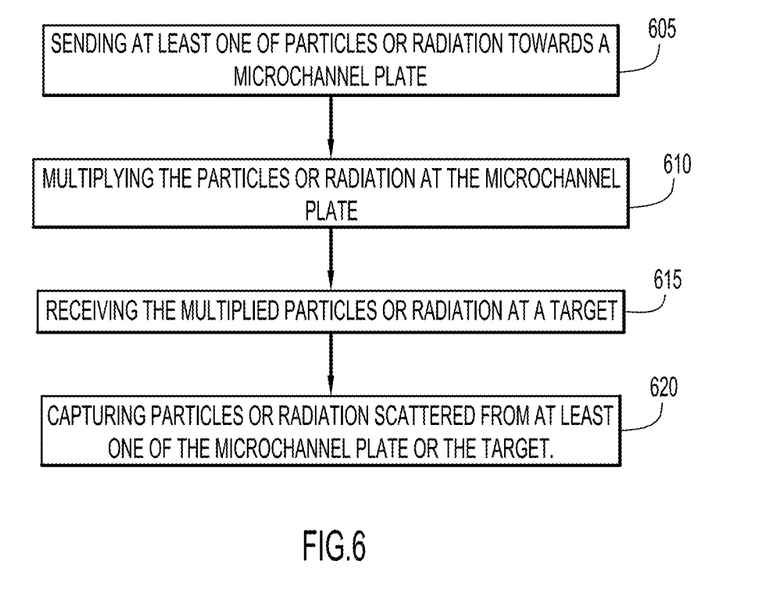
FIG. 6 is a flow chart illustrating a method of capturing scattered particles and/or radiation.

With reference now made to FIG. 6, illustrated therein is flowchart 600 depicting a process capturing back scattered particles or radiation. The process begins in step 605 in which particles or radiation are sent towards a microchannel plate. For example, the particles or radiation may comprise electrons sent from a photocathode in a light enhancement device. Specifically, photons of a light image may strike a light sensitive compound of the photocathode, causing the photocathode to emit a corresponding electron image. The particles and radiation may also take the form of, for example, ions, x-rays, and/or ultraviolet radiation.

In step 610, the sent particles are multiplied at the microchannel plate. According to examples, the microchannel plate may be a single microchannel plate, or multiple microchannel plates. For example, the microchannel plate may be comprised of a chevron or Z-stack microchannel plate.

In step 615, the multiplied particles or radiation output from the microchannel plate are received at a target. The target may take the form of a luminescent screen, such as a phosphor screen, a phosphorescent screen, electro-optical devices which convert charged particles into radiation, or opteo-electrical devices which convert radiation into charged particles. According to other embodiments, the target may comprise a cathode to receive the charged particles or radiation.

In step 620, particles or radiation that rebound or scatter from at least one of the microchannel plate or the target are captured. According to examples, electrons emitted from a photocathode may be sent towards a microchannel plate, some of which will back scatter from a face of the microchannel plate. In order to ensure that the scattered electrons are not accelerated back toward the microchannel plate, a collimator may be arranged between the source and the microchannel plate. Specifically, the collimator may be arranged between the source and the microchannel plate so that rebounded electrons will strike and be absorbed by the collimator before they can be reaccelerated back towards the microchannel plate.

According to other examples, particles or radiation scattered from the target may be captured. For example, a collimator may be arranged between the microchannel plate and the target so that electrons that rebound from the target may be absorbed by the collimator before they are reaccelerated back toward the target.

Of course, capturing of particles can be performed for the particles and/or radiation that scatter from both the microchannel plate and the target.

According to examples, the collimators comprise plates with holes or channels surrounded by very thin walls. To collimate the particles and/or radiation, the channels of the collimators may be substantially parallel to the direction that the particles and/or radiation travel. For example, if an electric field is used to accelerate charged particles, such as electrons, from the source towards the microchannel plate, the channels in the collimator located between the source and the microchannel plate will be substantially parallel to the direction of the electric field. Similarly, if a second electric field is used to accelerate the multiplied particles from the microchannel plate towards the target, the channels in the collimator located between the microchannel plate and the target will be substantially parallel to the direction of the second electric field. According to other examples, the collimators used to capture the scattered particles and/or radiation may take the form of additional microchannel plates. Like the microchannel plates used to multiply the particles, the collimator microchannel plate may provide additional multiplication of the particles and/or radiation as the particles and/or radiation pass through the collimator on their way to either the microchannel plate or the target.

The above description is intended by way of example only.

What is claimed is:

1. An apparatus comprising:
a source that produces source charged particles;
a collimating microchannel plate arranged after the source, wherein the collimating microchannel plate produces collimated charged particles from the source charged particles;
an intensifying microchannel plate arranged after the collimating microchannel plate, wherein the intensifying microchannel plate produces intensified particles from the collimated charged particles; and
a target for the intensified particles arranged after the intensifying microchannel plate wherein the target comprises a phosphor screen,
wherein the apparatus is implemented in a light enhancement device.

2. The apparatus of claim 1, further comprising:
a first electric field located between the source and the intensifying microchannel plate;
and
a second electric field located between the intensifying microchannel plate and the target.

3. The apparatus of claim 1, further comprising a second collimating microchannel plate located between the intensifying microchannel plate and the target.

4. The apparatus of claim 1, further comprising:
a first electric field located between the source and the intensifying microchannel plate; and
a second electric field located between the intensifying microchannel plate and the target, and
wherein the collimating microchannel plate comprises channels arranged substantially parallel to at least one of the first electric field or the second electric field.

5. The apparatus of claim 1, wherein the collimating microchannel plate comprises a second intensifying microchannel plate configured to multiply the source particles.

6. The method of claim 1, wherein the source comprises a photocathode.

7. The apparatus of claim 1, wherein a first-side active area of the collimating microchannel plate faces but does not touch the source, and a second side active area of the collimating microchannel plate faces but does not touch the target.

8. The apparatus of claim 7, wherein the second-side active area comprises a material configured to absorb the collimated charged particles.

9. The apparatus of claim 1, wherein the collimating microchannel plate comprises drawn glass.

10. The apparatus of claim 1, wherein the collimating microchannel plate comprises a crystalline material doped with an alkali metal.

11. The apparatus of claim 10, wherein the crystalline material comprises silicon.

12. The apparatus of claim 1, wherein the light enhancement device comprises night vision goggles.

13. The apparatus of claim 1, wherein the light enhancement device comprises a scope for a firearm.

14. The apparatus of claim 3, wherein the second collimating microchannel plate comprises a second intensifying microchannel plate.

15. The apparatus of claim 3, wherein a first-side active area of the second collimating microchannel plate faces but does not touch the microchannel plate, and a second side active area of the second collimating microchannel plate faces but does not touch the target.

16. A method, comprising:
sending source particles from a particle source of a light enhancement device towards an intensifying microchannel plate of the light enhancement device;
multiplying the particles at the intensifying microchannel plate;
receiving the multiplied particles at a target of the light enhancement device, wherein the target comprises a phosphor screen; and
capturing particles scattered from the microchannel plate at a collimating microchannel plate arranged between the intensifying microchannel plate and the source particle.

17. The method of claim 16, wherein:
accelerating the particles toward the intensifying microchannel plate with an electric field provided between the source and the intensifying microchannel plate.

18. The method of claim 17, wherein sending particles comprises sending electrons.

19. The method of claim 16, further comprising multiplying the particles in the channels of the collimating microchannel plate.

20. The method of claim 17, further comprises arranging a second collimating microchannel plate in the path of the multiplied particles between the microchannel plate and the target.

21. The method of claim 20, wherein:
sending further comprises accelerating the multiplied particles towards the target with a second electric field provided between the intensifying microchannel plate and the target; and
arranging the second collimating microchannel plate comprises arranging channels of the second collimating microchannel plate substantially parallel to a direction of the second electric field.

* * * * *